(12) United States Patent
Sapper et al.

(10) Patent No.: US 8,651,444 B2
(45) Date of Patent: Feb. 18, 2014

(54) FRICTION ADJUSTMENT MECHANISM FOR A SUPPORT APPARATUS

(75) Inventors: Richard Sapper, Milan (IT); Ronald Snyder, Macungie, PA (US)

(73) Assignee: Knoll, Inc., East Greenville, PA (US)

( * ) Notice: Subject to any disclaimer, the term of this patent is extended or adjusted under 35 U.S.C. 154(b) by 0 days.

(21) Appl. No.: 13/593,807

(22) Filed: Aug. 24, 2012

(65) Prior Publication Data

US 2013/0221174 A1 Aug. 29, 2013

(51) Int. Cl.
*A45D 19/04* (2006.01)

(52) U.S. Cl.
USPC ............ 248/371; 248/218.4; 248/284.1; 248/917

(58) Field of Classification Search
USPC ......... 248/218.4, 274.1, 276.1, 371, 124.1, 248/284.1, 917; 16/330, 340; 403/84, 91
See application file for complete search history.

(56) References Cited

U.S. PATENT DOCUMENTS

| | | | |
|---|---|---|---|
| 3,309,121 A * | 3/1967 | Fentiman | 403/176 |
| 5,971,652 A * | 10/1999 | Bartlett et al. | 403/84 |
| 6,505,988 B1 * | 1/2003 | Oddsen, Jr. | 403/110 |
| 6,672,553 B1 * | 1/2004 | Lin | 248/276.1 |
| 6,739,096 B2 | 5/2004 | Feldpausch et al. | |
| 6,863,252 B2 | 3/2005 | Bosson | |
| 6,905,101 B1 | 6/2005 | Dittmer | |
| 7,014,157 B2 | 3/2006 | Oddsen | |
| 7,182,301 B1 | 2/2007 | Oddsen, Jr. et al. | |
| 7,246,780 B2 | 7/2007 | Oddsen, Jr. | |
| 7,252,277 B2 | 8/2007 | Sweere et al. | |
| 7,389,965 B2 | 6/2008 | Oddsen, Jr. et al. | |
| 7,604,210 B2 * | 10/2009 | Oddsen et al. | 248/280.11 |
| 8,342,462 B2 * | 1/2013 | Sapper et al. | 248/124.1 |
| 8,448,906 B2 * | 5/2013 | Sapper et al. | 248/125.2 |
| 8,453,980 B2 * | 6/2013 | Sapper et al. | 248/125.7 |
| 2002/0011544 A1 * | 1/2002 | Bosson | 248/121 |
| 2005/0028499 A1 | 2/2005 | Greif et al. | |
| 2005/0066475 A1 | 3/2005 | Minami | |
| 2005/0133678 A1 | 6/2005 | Dittmer | |
| 2005/0284997 A1 | 12/2005 | Tisbo et al. | |
| 2006/0266909 A1 | 11/2006 | Oddsen, Jr. et al. | |
| 2008/0237439 A1 | 10/2008 | Oddsen | |
| 2010/0044541 A1 | 2/2010 | Sapper et al. | |
| 2010/0084527 A1 | 4/2010 | Lau | |
| 2010/0282923 A1 | 11/2010 | Wang | |
| 2011/0303800 A1 * | 12/2011 | Sapper et al. | 248/70 |
| 2012/0217369 A1 * | 8/2012 | Sapper et al. | 248/458 |
| 2013/0112828 A1 * | 5/2013 | Sapper et al. | 248/274.1 |

FOREIGN PATENT DOCUMENTS

| | | |
|---|---|---|
| GB | 2440606 A | 2/2008 |
| WO | 2007118862 A1 | 10/2007 |
| WO | 2007137905 A1 | 12/2007 |
| WO | 2008012368 A1 | 1/2008 |
| WO | 2008022873 A2 | 2/2008 |
| WO | 2008091998 A2 | 7/2008 |
| WO | 2008113860 A2 | 9/2008 |

* cited by examiner

*Primary Examiner* — Terrell McKinnon
*Assistant Examiner* — Daniel J Breslin
(74) *Attorney, Agent, or Firm* — Buchanan Ingersoll & Rooney PC (57) ABSTRACT

A support apparatus includes an arm assembly attached to a mounting body. A frictional adjustment mechanism is provided between the mounting body and the arm assembly that permits an amount of friction induced by tilting of the mounting body to be adjusted so that a greater or lesser amount of force is needed by a user to tilt the mounting body and any object held by the mounting body. Preferably, the mounting body is configured to hold a monitor, liquid crystal display, or other display device.

20 Claims, 5 Drawing Sheets

FRICTION ADJUSTMENT MECHANISM FOR A SUPPORT APPARATUS

CROSS-REFERENCE TO RELATED APPLICATIONS

The present application claims priority to U.S. Provisional Patent Application No. 61/538,327, which was filed on Sep. 23, 2011.

FIELD OF INVENTION

The present invention relates to furniture or fixtures such as monitor arms and support arms that are sized and configured to support copy holders, display devices, computer monitors, liquid crystal displays, televisions, lights, and other objects.

BACKGROUND OF THE INVENTION

Support arms such as monitor supports or copy holders often include one or more arms that extend from a support post. The arm is configured to hold an object, such as a monitor. The support post is typically clamped to a support surface, such as a desk, table or partition wall. Examples of support arms and similar support apparatuses are disclosed in U.S. Pat. Nos. 7,389,965, 7,252,277, 7,246,780, 7,182,301, 7,048,242, 7,014,157, 6,905,101, 6,863,252, 6,739,096, 6,679,096, 6,554,238, 6,554,235, 6,505,988, 6,499,704, 5,992,809, 5,553,820, D518,063, and D537,323, U.S. Patent Application Publication Nos. 2005/0284997, 2005/0133678, 2005/028499, 2006/0266909, 2008/0237439, and 2010/0044541, World Intellectual Property Publication Nos. WO 2008/091998, WO 2008/113860, WO 2008/012368, WO 2008/022873, WO 2007/137905 and WO 2007/118862 and United Kingdom Patent Application No. GB 2,440,606.

When using a support arm, a user typically rotates the support arm about a support post or base to position the support arm at a desired location for viewing or using a computer screen or other object held by the support arm. The user may also tilt the device being held to a desired position. For instance, if a light or monitor is being held, a user may tilt the monitor or light about an axis defined by the support arm to adjust the light being provided or where a user may have to look to see the monitor. The mechanisms used to retain the position of the tilted object, however, often fails to hold objects that have substantial weight.

For instance, monitor arms often are unable to permit a monitor of over 25 pounds to be tilted to a desired position by directly moving the monitor upwards or downwards about an axle. Instead, such monitors often have to be supported so that they cannot be directly tilted upward or downwards. Other portions of the arm must be tilted or moved to adjust where the monitor may be positioned, which may require a user to exert a significant amount of time to make a simple adjust to a monitor's position.

We have determined that a new support arm design is needed that permits a user to quickly and easily tilt the position of relatively heavy objects. We have determined that such a design preferably permits a user to directly tilt a heavy monitor or other object about a horizontal axis or a vertical axis. The amount of force needed to provide such tilting is also preferably adjustable.

SUMMARY OF THE INVENTION

A support apparatus is provided that is configured to adjustably position an object such as a monitor, liquid crystal display, television, light, display device, tablet, or other object. The support apparatus may include an arm assembly attached to a mounting body. A pivotal attachment may be formed between the arm assembly and the mounting body to permit the mounting body to be tilted relative to the arm assembly. A friction adjustment mechanism may be attached to the pivotal attachment to permit a user to adjust an amount of friction induced by tilting of the monitor, which may increase or decrease the amount of force needed to tilt the held object. Adjustment of the friction that is induced by such tilting may also help ensure that an object held by the support apparatus may be maintained in a desired tilted position.

In one embodiment, the support apparatus includes an arm assembly that has a first arm member, a mounting body for a display or a light that is rotatably attached to the first arm member of the arm assembly via a rotatable attachment located between the mounting body and the first arm member, and a friction adjustment mechanism. The rotatable attachment may include an axle about which the mounting body moves when rotating via the rotatable attachment. The friction adjustment mechanism is positioned between the mounting body and the arm assembly. Actuation of the friction adjustment mechanism to move friction inducing elements closer to rotatable elements attached to the axle of the rotatable attachment so that more friction occurs when the mounting body is rotated via the rotatable attachment adjusts an amount of friction applied during tilting of the mounting body via the rotatable attachment.

In another embodiment, the support apparatus includes a mounting body for a display device such as a liquid crystal display, tablet device, monitor, or television. The support apparatus also includes an arm assembly that includes a first arm member that defines a cavity, an axle receiving body attached to the mounting body, and an axle that extends through the axle receiving body and into the cavity of the first arm member. The axle has a hole. The support apparatus also includes a friction adjustment mechanism that includes a plurality of rotatable elements positioned in the cavity that are attached to the axle so that the rotatable elements rotate when the axle rotates and a plurality of friction inducing elements positioned in the cavity that are each attached to the first arm member. Each of the friction inducing elements has an inner opening through which the axle extends that is sized so that the axle is rotatable when positioned in that inner opening. The friction inducing elements are positioned adjacent to the rotatable elements so that at least one of the rotatable elements rubs against or otherwise engages at least one of the friction inducing elements when the axle rotates. The friction adjustment mechanism also includes a rotatable member that extends into the hole of the axle. The rotatable member is rotatable in a first direction to move further into the hole and is rotatable in a second direction that is opposite the first direction to move out of the hole. The movement of the rotatable member in the first direction causes the friction inducing elements to be further compressed against the rotatable elements to increase an amount of friction caused by rotation of the axle. The rotation of the rotatable member in the second direction cause the friction inducing elements to be less compressed to reduce an amount of friction caused by rotation of the axle.

Embodiments of the support apparatus may include a mechanical tool that is releasably attached to the mounting body. An example of such a tool is a screwdriver or Allen wrench. The mechanical tool is positionable to engage the rotatable member to drive rotational movement of the rotatable member for adjusting the amount of friction induced between the rotatable elements and the friction inducing elements that occurs when the axle rotates.

In one embodiment, the friction adjustment mechanism can also include a body portion that is positioned adjacent to the first arm member so that the first arm member is between the axle receiving body and the body portion. The rotatable member may extend through the body portion to extend into the hole of the axle. The body portion of the friction adjustment mechanism may move when the rotatable member moves in the first direction and may also move when the rotatable member moves in the second direction.

The friction inducing elements may also include one or more apertures sized to mate with one or more protuberances of a first arm member that extends into the cavity of the first arm member. Movement of the rotatable member in the first direction can drive movement of the friction inducing elements along the protuberances. For instance, rotation of the rotatable member in the first direction may cause the friction inducting elements to move along the protuberances to be further compressed against the rotatable elements attached to the axle and rotation of the rotatable member in the second direction may result in the friction inducing elements moving along the protuberances to be less compressed against the rotatable elements.

In one embodiment, the rotatable elements include first, second, and third rotatable elements and the friction inducing elements include first, second, and third friction inducing elements. The first friction inducing element can be positioned between the first and second rotatable elements. The second friction inducing element can be positioned between the second and third rotatable elements. The third friction inducing element can be positioned next to the third rotatable element on a side of the third rotatable element that is opposite a side of the third rotatable element along which the second friction inducing element is positioned.

The rotatable member may be any of a number of types of members such as a bolt or screw. The axle may be a shaft such as a rod, bolt, screw, or other elongated member. The axle may include a shaft that has a polygonal cross section such as a triangular, square, hexagonal, or pentagonal cross section.

The mounting body may include any of a number of structures such as brackets or other devices used to mount a display device or light via one or more fasteners or other attachment mechanisms. In one embodiment, the mounting body may be configured to hold or retain a monitor, liquid crystal display, television, tablet computer device, or other display device.

The support apparatus may include other elements. For instance, the support apparatus may include a post that is attached to the arm assembly. The support apparatus could also include a mounting device such as a clamp attached to the post so that the post is mountable on a work surface or wall. The support apparatus could also include a collar on which the arm assembly is positioned or attached. The collar may be moveable along the post to vertically adjust a position of the arm assembly and mounting body.

It should be understood that the rotatable elements and friction inducing elements may be any of a number of different types of structures. For instance, the rotatable elements may be washers or plate members or disc shaped members or polygonal shaped plates having an inner aperture for mating with the axle or may be shaped members that are integrally formed or attached to the axle via a molding process, casting process, or welding process. The friction inducing elements may be comprised of an annular body such as a washer or other member that is comprised of a material that is capable of inducing friction when the rotatable member engages the friction inducing element when the friction inducing element or rotatable element move. Examples of such structures may include washers or other members that have an inner opening such as a central inner opening sized so that the axle can pass through that opening and rotate within that opening without causing rotation of the friction inducing element.

It should be understood that the mounting body may be an assembly of interconnected bodies or a one piece body such as a plate or bracket for receiving one or more fasteners to attach a display device or other object to the mounting body. In some embodiments, the mounting body may include an inner portion and a peripheral frame that is rotatable about the inner portion. For example, the inner portion may be a circular body and the peripheral frame may be a rectangular plate having an inner opening sized to receive the circular body. In other embodiments, the inner portion may be an oval shaped plate and the peripheral frame portion may be a polygonal shaped annular structure or a generally circular annular shaped structure having an inner opening sized to receive the inner portion. It should be appreciated that a display device may be attachable to the peripheral frame portion of the mounting body for such embodiments so that rotation of the peripheral frame also causes rotation of the display device.

Some embodiments of the support apparatus also include a positionable body moveably attached to an inner portion of the mounting body. The positionable body engages a lip of a peripheral frame portion of the mounting body that is rotatable about the inner portion of the mounting body. The positionable body is adjustably positioned to at least one of increase and decrease an amount of force needed to rotate the peripheral frame portion of the mounting body about the inner portion of the mounting body. In one embodiment, a mechanical tool is releasably attached to the mounting body and is positionable to engage the rotatable member of the friction adjustment mechanism to drive rotational movement of that rotatable member for adjusting the amount of friction induced between the rotatable elements and the friction inducing elements caused by rotation of the axle. The mechanical tool may also be positionable to engage a second rotatable member to drive rotation of that rotatable member. The second rotatable member may be moveable into and out of a channel defined within one of the inner portion of the mounting body and a member receiving body attached to the inner portion of the mounting body. Rotational movement of the second rotatable member may adjust the positionable body to at least one of increase and decrease the amount of force needed to rotate the peripheral frame portion of the mounting body about the inner portion of the mounting body.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of the support apparatus are shown in the accompanying drawings and certain present preferred methods of practicing the same are also illustrated therein. It should be appreciated that like reference numbers used in the drawings may identify like components.

DETAILED DESCRIPTION OF PRESENT PREFERRED EMBODIMENTS

Referring to FIGS. 1-7, a support apparatus 1 may include a support post 5 that is attached to a work surface 7 by a clamp or other mounting device 3. The work surface 7 may be a table, desk, or other article of furniture about which someone may work.

An arm assembly 9 is connected to the support post 5. The arm assembly may be vertically adjustable about the post 5 to adjust a height of the arm assembly 9. For instance, a portion of the arm assembly may rest on a vertically adjustable collar 6 that is positioned on the post and is moveable vertically on the post to adjust the vertical position of the arm assembly. The arm assembly 9 may be supported by the post 5 so that the arm assembly 9 is rotatable about the post 5. In alternative embodiments, the arm assembly may be connected to a gas spring and be adjustable horizontally and vertically via articulation points between different components of the arm assembly 9.

The arm assembly 9 may include a number of different arm members or linkages. For instance, a first arm member 21 may be attached to or supported by the post 5 and also be pivotally attached to a second arm member 23. The second arm member 23 may be pivotally attached to a third arm member 51 via a pivot pin 71. The third arm member 51 may be attached to a monitor mount or other object mounting body 11. The object mounting body 11 may be attached to the third arm member 51 via a friction adjustment mechanism 13 that is used to control a tiltability of the object mounting body 11. It should be understood that the arm members 21, 23 and 51 may each be rotatable or pivotable relative to each other to permit a user to adjust a position of the arm assembly in any of a number of different configurations. The mounting body may also be rotated, or tilted, via a pivotal connection formed between the mounting body 11 and the third arm member 51.

Preferably, the object mounting body 11 is configured to hold a monitor 17 or other type of display device such as a tablet, liquid crystal display or television. For instance, the mounting body may include a peripheral frame 11a that has holes sized to receive fasteners for mounting a monitor or other object to the peripheral frame 11a. Of course, other objects could alternatively be held by the object mounting body 11 such as a light or other object. The object mounting body may also include an inner portion 11b. The peripheral frame 11a may be rotatable relative to the inner portion 11b so that the monitor attached to the mounting body may be rotated in a generally circular path such as a circular path or an elliptical path about the inner portion 11b when held in any particular position.

The peripheral frame 11a may be a plate or other member that has any of a number of shapes. The peripheral frame 11a has an inner opening such as a central opening that is sized to receive the inner portion 11b. The inner portion 11b may be generally circular member such as a circular plate, a disc, an oval shaped plate, or a an oval shaped member. The inner opening of the peripheral frame 11a that is sized to receive the inner portion 11b may be at least partially defined by a lip 85. The lip may be a sidewall or other structure of the peripheral frame 11a that is adjacent the inner opening of the peripheral frame 11a.

The force needed to rotate the peripheral frame 11a relative to the inner portion 11b may be adjusted via an adjustment mechanism 80 that includes a positionable body 84 that is configured to engages the lip 85 of the peripheral frame 11a. The positionable body 84 may have an aperture that is alignable with a channel defined within a portion of the inner portion or within a body 87 attached to the inner portion 11b. The channel may be defined within a body 87 that is integrally attached or a molded portion of the inner portion 11b of the object mounting body 11 for example. A screw 89, bolt, or other rotatable member may extend through the aperture in the positionable body 84 and into the channel 87 to engage or mate with one or more threads defined in the inner portion 11b or a body 87 that defines the channel so that the screw 89 is moveable into and out of the channel to adjust a position of the positionable body 84.

Rotating the screw 89 in a first direction may position the screw 89 further into the channel to tighten the positioning of the positionable body 84 so that a portion of this body has a tighter engagement against the lip 85 formed in the peripheral frame 11a so that a greater amount of force is needed to rotate the peripheral frame 11a relative to the inner portion 11b. Rotating the screw 89 in a second direction that is opposite the first direction may adjust a position of the positionable body 84 so that it has a looser engagement with the lip 85 so that less force is required from a user to rotate the peripheral frame 11a so that the peripheral frame 11a is more easily rotated about the inner portion 11b. The adjustment of the positionable body adjusts an amount of compression the positionable body applies against the lip 85 of the peripheral frame, which can make rotation of the peripheral frame 11a require more or less force. Adjustment of the positionable body 84 can provide a greater compression against the lip 85 which can also help ensure a heavier display device does not rotate the peripheral frame from a user selected position to another position due to gravity and the weight of that display device. Conversely, an adjustment of the positionable body 84 to provide less compression against the lip 85 can permit a display device having a much lower weight to be more easily rotated by a user when that device is attached to the peripheral frame 11a so that the device is more easily moved to any of a number of a user selectable rotated positions.

It should be understood that a mechanical tool such as an Allen wrench or screw driver may be used to rotate the screw 89. The mechanical tool 31 may be sized for attachment to the peripheral frame 11a of the object mounting body 11 or to another portion of the object mounting body. For instance, the inner portion 11b or peripheral frame 11a portion may include a profile sized to permit the mechanical tool to be releasably clamped or releasably attached to the object mounting body.

Embodiments of the arm assembly 9 may include an outermost linkage, such as the third arm member 51 in the embodiment shown in FIGS. 1-7. The outermost linkage may be pivotally attached to the mounting body 11 via an attachment to the inner portion 11b of the mounting body. The inner portion 11b may have an axle receiving body that includes an axle receiving body portion 53. The axle receiving body portion 53 may be attached to the inner portion 11b adjacent to a friction adjustment mechanism body portion 55. The friction adjustment mechanism body portion 55 may be attached to the mounting body 11 such that the body portion 55 is slideable along a portion of the inner portion 11b of the mounting body 11.

Alternatively, the body portion 55 may be positioned adjacent to the mounting body 11 and be spaced from the inner portion 11b of the mounting body while being attached to the axle receiving body 53 via axle 49. As yet another alternative, the axle receiving body portion 53 may be attached to the inner portion 11b such that the axle receiving body 53 is moveable along a portion of the mounting body 11 so that the axle receiving body portion is moveable relative to the body portion 55 of the friction adjustment mechanism 13.

The third arm member 51 may be positioned between the axle receiving body portion 53 and frictional adjustment body portion 55 of the friction adjustment mechanism 13. In an alternative embodiment, the friction adjustment body portion 55 may be integrally attached to the third arm member 51.

An axle 49 may extend from the axle receiving body portion 53 through a cavity 11b defined in the third arm member 51 to a position adjacent the body portion 55. The axle 49 may define a shaft that has any of a number of types of cross sections such as a polygonal shaped cross section. Examples of the cross section of the axle 49 may be a square, rectangular, hexagonal, octagonal, or triangular cross section. The axle 49 may be a bolt or screw in some embodiments. Preferably, the axle 49 extends along its length vertically or horizontally. It is contemplated that the axle 49 could extend along its length in other directions, such as an angle of forty-five degrees relative to perfectly horizontal or perfectly vertical.

A first end 49a of the axle 49 may be adjacent the axle receiving body portion 53 and the opposite end 49b of the axle 49 may be adjacent the body portion 55 of the friction adjustment mechanism 13. If the axle is a screw or a bolt, the first end 49a may be the head of the screw or bolt. A hole 49e such as a channel or other type of aperture may be formed in the second end 49b of the axle 49. The hole 49e may be a tapped hole or a cavity formed in the second end 49b of the axle and may have threads formed within the body of the axle that defines the hole 49e. The middle portion 49c of the axle 49 may be positioned in the cavity 51b of the third arm member 51. In some embodiments, the middle portion 49c and the second end 49 may be positioned in the cavity 51b of the third arm member 51.

The mounting body 11 may be attached to the axle receiving body portion 53 such that movement of the mounting body 11 moves the axle receiving body portion 53. The axle receiving body portion 53 may be attached to the mounting body using any of a number of different fastening mechanisms or the axle receiving body 53 may be molded or otherwise formed as an integral part of the inner portion 11b of the mounting body 11.

The axle receiving body 53 may have an opening 53a sized to receive and mate with the cross section of the axle 49 so that rotation of the mounting body 11 about the axle 49 also causes the axle 49 to rotate relative to the third arm member 51.

The body portion 55 of the friction adjustment mechanism may have an opening through which a screw, bolt or other rotatable member 47 is positionable. The rotatable member 47 extends from the body portion 55 to a position located in a hole 49e of the axle 49. The hole 49e may be, for example, a tapped hole formed in the axle 49. The rotatable member 47 is rotatable within the hole 49e for moving further into or out of the hole 49e. For example, the axle 49 may have threads formed on an inner surface of the axle that defines the hole. Those threads may mate with threads formed on the rotatable member 47 so that the rotatable member is moveable into and out of the axle 49 via the hole 49e. In one embodiment, the hole 49e is a channel, cavity, or other aperture defined within the axle 49 by an inner wall that has at least one thread formed on the inner wall to facilitate movement of the rotatable member 47 into and out of the hole 49e.

Rotation of the rotatable member in a first direction may move the rotatable member further into the hole of the axle, for example. Rotation of the rotatable member 47 in a second direction that is opposite the first direction may move the rotatable member out of the hole 49e of the axle 49. In some embodiments, the body portion 55 of the friction adjustment mechanism may have an opening through which the rotatable member 47 passes so that it receives the rotatable member 47 and movement of the rotatable member causes the body portion 55 to move closer toward the third arm member 51 as the rotatable member is moved further in to the hole 49e and the body portion 55 moves away from the third arm member 51 when the rotatable member 47 is moved out of the hole 49e. In other embodiments, rotation of the rotatable member 47 may cause the axle receiving body 53 to move closer to the third arm member 51 or further away from the third arm member 51 by causing the axle to move further toward the body portion 55.

A plurality of friction inducing elements 45 are positioned adjacent to rotatable elements 43 that are configured to move when the mounting body 11 and axle 49 rotate. The friction inducing elements 45 may be arranged so that each friction inducing element 45 is between two different rotatable elements 43 that are configured to move when the mounting body 11 rotates about axle 49. For instance, the rotatable elements 43 may each be washers or other bodies that have an inner opening sized and configured to provide an interference fit with the axle 49 or to mate with the cross sectional shape of the axle 49 so that when the axle 49 rotates, the rotatable elements 43 also rotate. The friction inducing elements 45 may have an annular body with an inner opening that is larger than the width or diameter of the axle 49 so that spacing 45a exists between the friction inducing elements 45 and the axle so that the axle 49 may rotate relative to the friction inducing elements 45 and the friction inducing elements 45 will not rotate when the axle 49 rotates.

Each of the friction inducing elements 45 may have a body that also has one or more apertures 45b. The apertures 45b are sized to receive or mate with ribs 51a, splines, or other types of protuberances formed along an inner surface of the third arm 51 that extend into an inner cavity 51b that receives a portion of the axle 49. The ribs 51a interlock with the apertures 45b so that the friction inducing elements 45 are affixed to the third arm 51 and are unable to rotate or otherwise move when positioned in the cavity 51b and attached to the third arm 51 via the interference fit between the ribs 51a and apertures 45b. Because the friction inducing elements are not free to rotate, they provide surfaces about which the rotatable elements 43 rub against or otherwise engage when the axle rotates 49 during tilting of the mounting body 11.

It should be appreciated that rotation of the rotatable member 47 permits the amount of friction induced by the friction inducing elements 45 to be adjusted. Movement of the rotatable element 47 into the hole 49e of the axle 49 may press the body portion 55 of the friction adjustment mechanism 13 toward third arm member 51, which may further tighten or compress the friction inducing elements 45 against the rotatable elements 43 so that the friction inducing elements 45 provide more friction when the axle 49 and mounting body 11 are rotated.

For instance, one side of the body portion 55 of the friction adjustment mechanism 13 may be configured to push the friction inducing elements 45 and rotatable elements 43 toward the axle receiving body portion 53 in the cavity 51*b* of the third arm member. A side of the body portion 55 may include a pushing element 55*a* that is sized and shaped to fit into the cavity for engaging against one of the rotatable elements 43 or friction inducing elements 45 to push the elements closer together or further compress the elements when the rotatable member 47 is moved further into the hole 49*e*. The friction inducing elements 45*b* may slide along the ribs 51 or other type of protuberances, and the rotatable elements may slide along the shaft of the axle 49 when the rotatable member is moved further into the hole 49*e* of the axle 49.

When the rotatable member 47 is moved out of the axle 49, the pressing element 55*a* of the body portion 55 may move away from the friction inducing elements 45 and rotatable elements 43, which reduces the compression experienced by the friction inducing elements 45 and rotatable elements 43 as these elements may move away from each other to reduce compression between the elements. The reduction of the compression caused by such movement can reduce the amount of friction induced by the friction inducing elements when the rotatable elements 43 rotate during rotation of the mounting body about the axle 49.

The rotatable member 47 may have a head portion 47*a* that has an opening 47*b*. A mechanical tool 31, such as an Allen wrench, may be releasably attached to the frame 11*a* of the mounting body 11 so that a user may use the mechanical tool 31 to rotate the rotatable member 47 to adjust the friction applied via the friction inducing elements 45 during rotation of the mounting body 11 about axle 49. Such adjustment may make moving the monitor require more force or permit a heavier monitor to have its positioned held, or maintained after being located in a desired tilted position.

It should be understood that the same mechanical tool 31 may be used to rotate the rotatable member 47 and the screw 89. The head of the screw 89 and head of the rotatable member 47 may each have a similarly defined profile to which the mechanical tool may matingly engage for rotating these elements. For example, the profile of the rotatable member 47 to which the mechanical tool 31 engages to drive rotation of this member may be defined by the opening 47*b*. The profile of the screw 89 sized for the mechanical tool 31 to engage for driving rotation of the screw 89 may be an opening or shape defined within the head of the screw 89 that is similar in shape or exactly the same shape as the profile defined by the opening 47*b*.

The friction inducing elements 45 may be composed of any of a number of different materials to provide a desired amount of friction. For instance, the friction inducing elements may be composed of steel, zinc, zinc plated steel, zinc plated steel with acetyl or nylon, die-cast zinc, another type of metal, a polymeric material, a composite material, or a combination of such materials. The rotatable elements 43 may also be composed of any of a number of different materials so that the rotation of the rotatable elements 43 as they engage the friction inducing members 45 experience a desired amount of friction. The rotatable elements 43 may be composed of steel, zinc, zinc plated steel, zinc plated steel with acetyl or nylon, die-cast zinc, another type of metal, a polymeric material, a composite material, or a combination of such materials.

A user may directly tilt a monitor or other object held or attached to the object mounting body 11 by directly tilting the object via the axle 49. For instance, if the axle is substantially horizontal, the user may tilt the monitor or other object vertically upwards or downwards about the axle 49 by pushing upwards or downwards directly on the monitor to rotate the mounting body 11, axle 49, and rotatable elements 43. The tilting of the mounting body may be performed independent of any adjustment of any position of an arm member of the arm assembly. For instance, the tilting of a monitor mounted to the mounting body 11 may be done without having to move the position of the arm assembly 9 or reposition any linkage of the arm assembly 9 to a different position. Further, such tilting can be accommodated without the use of a gas spring by use of the friction adjustment mechanism 13.

The tilting about axle 49 may also be done independently of any rotation of the monitor or other object held by the objecting mounting body 11 about the inner portion 11*b*. The rotation of the display device or other object held by the object mounting body 11 about inner portion 11*b* of the object mounting body 11 may also be performed independent of any titling about the axle 49 or movement of the arm assembly 9.

It should be understood that embodiments of the support apparatus may be configured to utilize a friction adjustment mechanism that permits the tilting of a monitor about the axle 49 of a rotatable attachment mechanism to be adjusted so that the position of the monitor or other display device or object may be maintained after the object is tilted about that axle 49 to a desired location. The weight of the object may range from five pounds to fifty pounds for some embodiments. It is contemplated that some embodiments may maintain a position of an object that weighs over fifty pounds. Further, the ability of the object to be maintained via the rotational attachment and the ease with which a user may manually tilt the display device or other object by directly touching the object to tilt it about the axle 49 can be adjusted via movement of the rotatable member 47.

It should be understood that the axle 49 may be configured to define a perfectly vertical axis of rotation or a substantially vertical axis of rotation about which the mounting body and display device may rotate in alternative embodiments. For such alternative embodiments, the mounting body 11 would tilt horizontally or substantially horizontally about the axis defined by the axle.

It should be appreciated that other variations of the present preferred embodiments discussed above may be made. For example, arm assemblies 9 or mounting body 11 may be attached to a support post 5 via a beam 81. A quick release mechanism 83 may attach each arm assembly to the beam 81. The friction adjustment mechanism 13 may be attached between a mounting body 11 and an arm member of the arm assembly 9. Multiple arm assemblies 9 may be attached to the beam 81.

Figure 1:
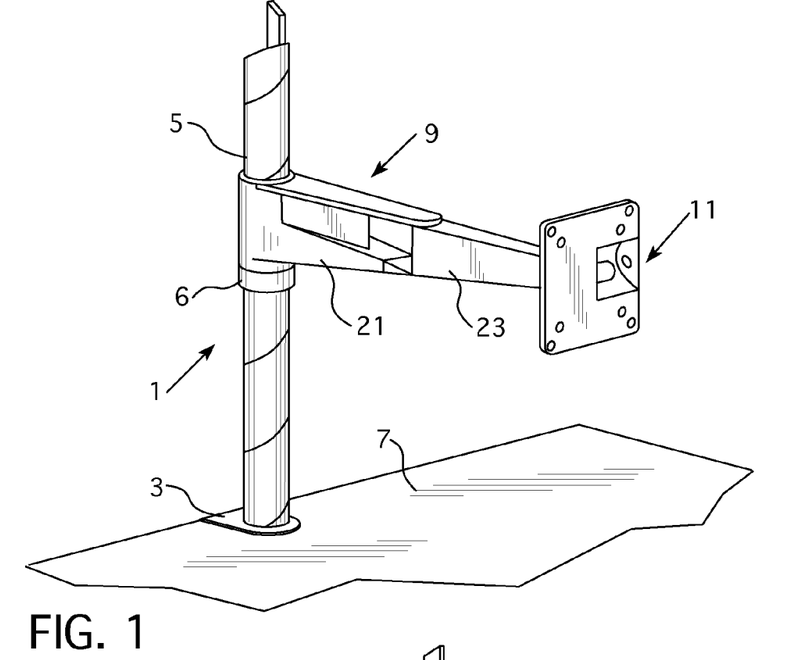
FIG. 1 is a perspective view of a first present preferred support apparatus.
Figure 2:
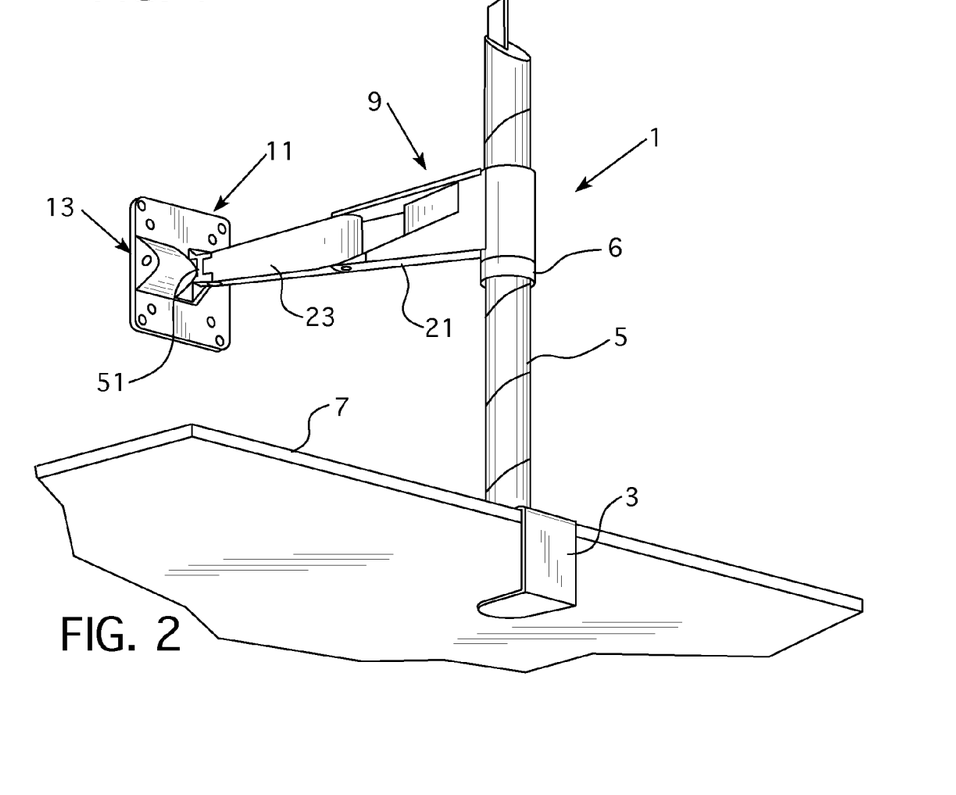
FIG. 2 is a rear perspective view of the first present preferred support apparatus.
Figure 3:
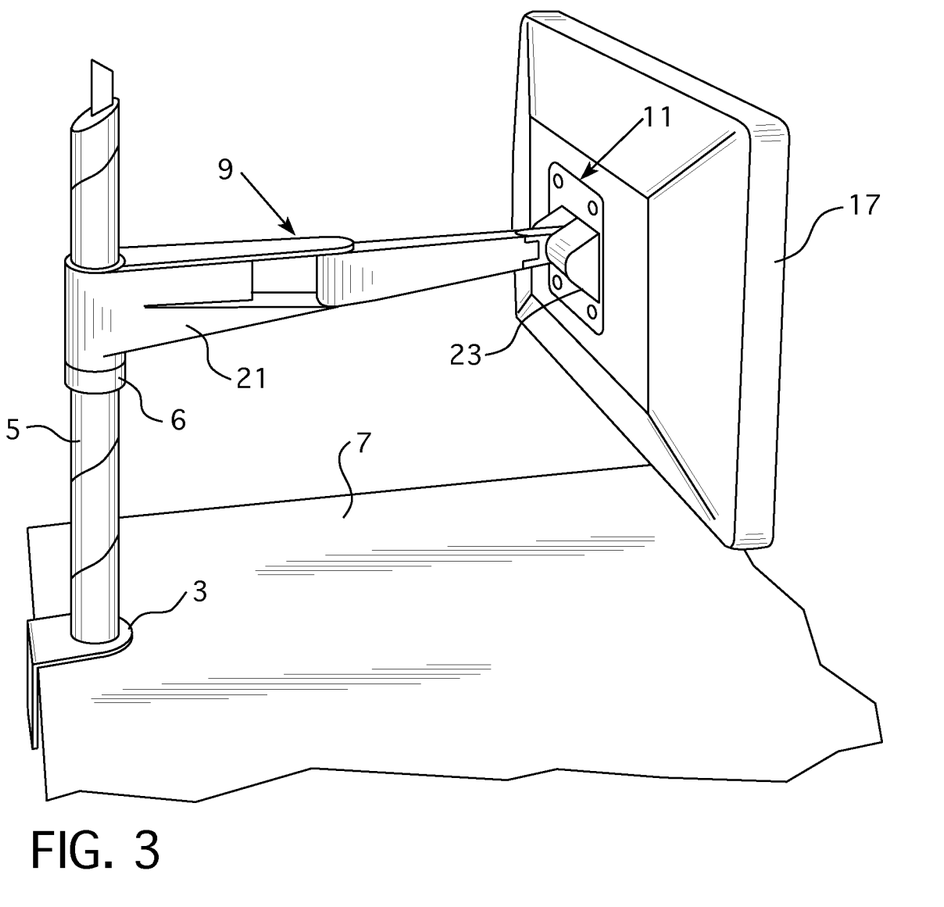
FIG. 3 is a rear perspective view of the first present preferred support apparatus.
Figure 4:
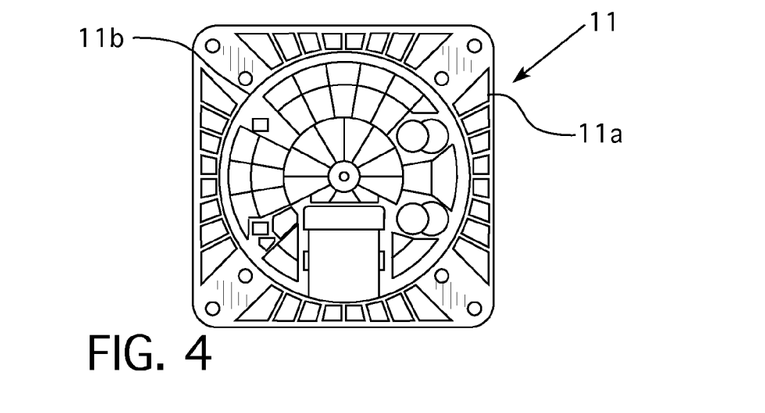
FIG. 4 is a front fragmentary view of the first present preferred support apparatus, which illustrates a present preferred mounting body of the support apparatus.
Figure 5:
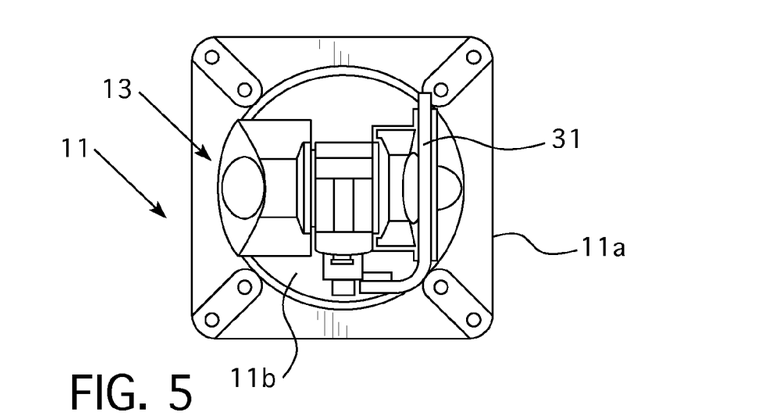
FIG. 5 is a rear fragmentary view of the first present preferred support apparatus, which illustrates a present preferred mounting body of the support apparatus.
Figure 6:
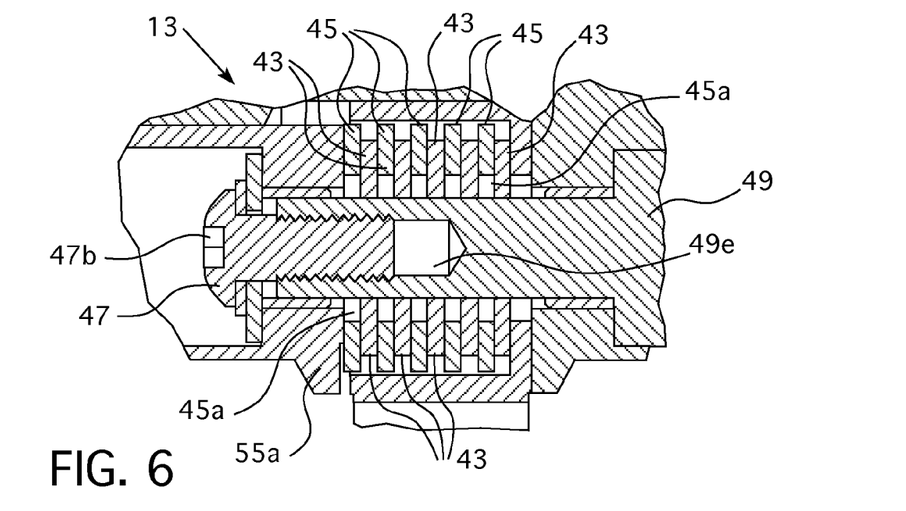
FIG. 6 is a cross sectional view of the first present preferred support apparatus taken along line B-B in FIG. 4.
Figure 7:
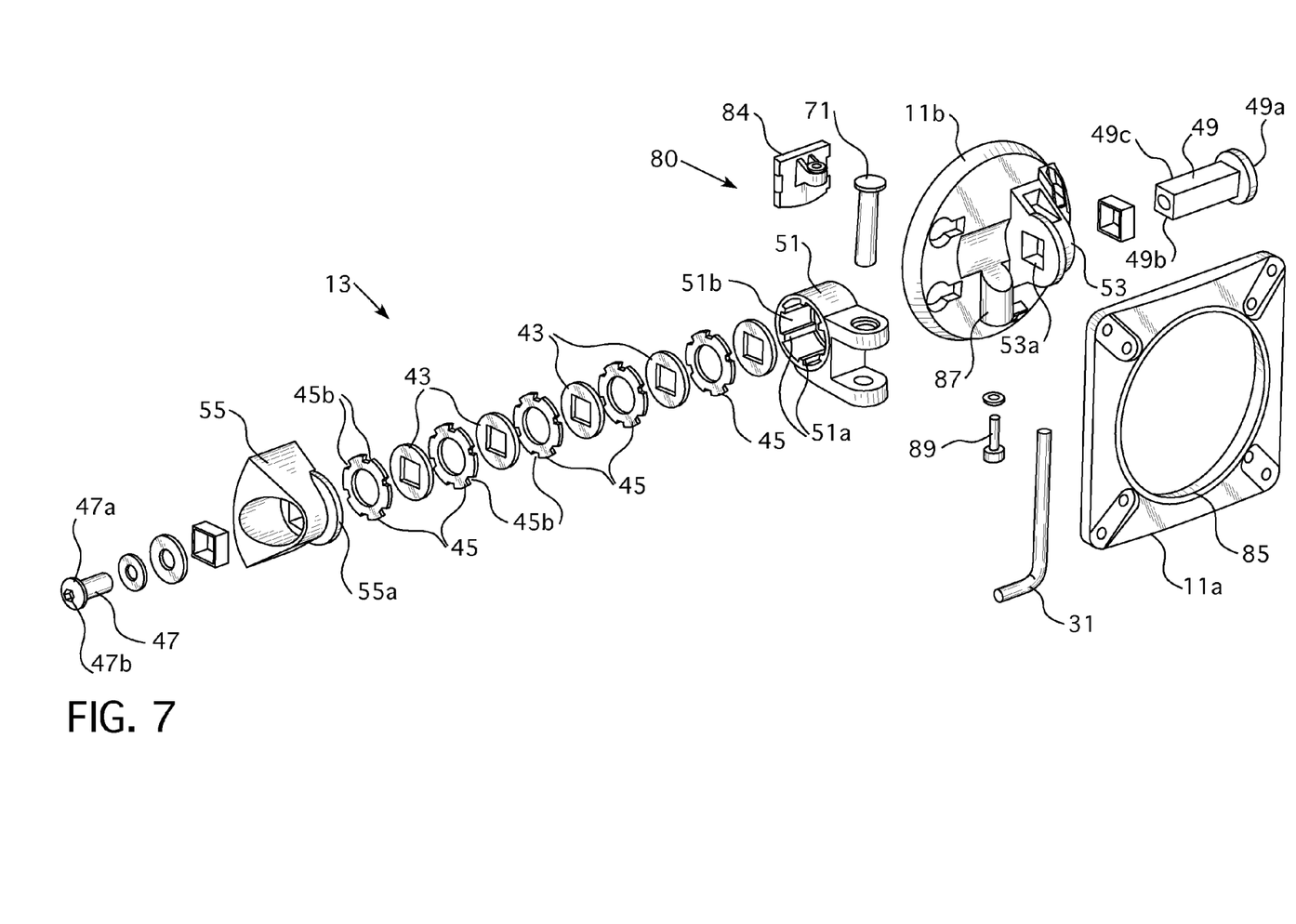
FIG. 7 is an exploded view of a present preferred friction adjustment mechanism that may be utilized in embodiments of the support apparatus and is utilized in the first present preferred support apparatus.
Figure 8:
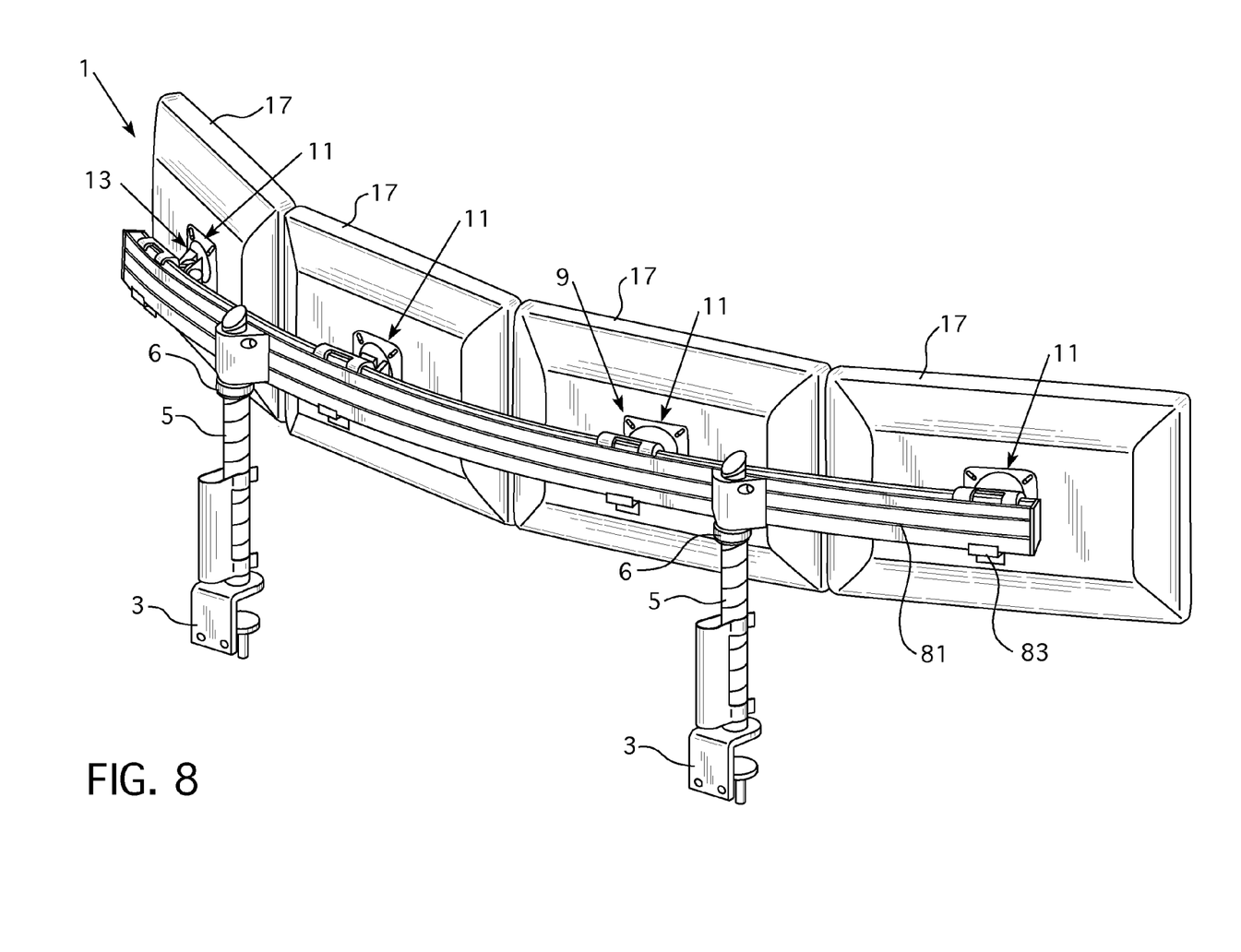
FIG. 8 is a perspective view of another present preferred embodiment of the support apparatus that may utilize embodiments of the present preferred friction adjustment mechanism.

It should be understood that the arm assembly 9 may have any of a number of different configurations. In one embodiment, the arm assembly 9 may include only one arm member, such as the third arm member 51. For example, as may be seen in FIG. 8, the arm assembly may include only the third arm member 51, which is attached between the quick release mechanism 83 and the mounting body 11. In other embodiments, the arm assembly may include two arm linkages connected together or more than three arm linkages connected together.

Other variations to the support apparatus may be appreciated from U.S. patent application Ser. Nos. 12/372,110 and 13/153,316 and U.S. Provisional Application Nos. 61/090,712 and 61/353,714. For instance, the frictional adjustment mechanism may be utilized in any of the different support apparatus designs or arm assembly designs disclosed in U.S.

patent application Ser. Nos. 12/372,110 and 13/153,316 and U.S. Provisional Application Nos. 61/090,712 and 61/353,714. The entirety of U.S. patent application Ser. Nos. 12/372,110 and 13/153,316 and U.S. Provisional Application Nos. 61/090,712 and 61/353,714 are incorporated by reference herein.

While certain present preferred embodiments of the support apparatus and certain embodiments of methods of practicing the same have been shown and described, it is to be distinctly understood that the invention is not limited thereto but may be otherwise variously embodied and practiced within the scope of the following claims.

We claim:

1. A support apparatus comprising:
    an arm assembly having a first arm member, the first arm member defining a cavity;
    a mounting body for a display device;
    an axle receiving body attached to the mounting body;
    an axle that extends through the axle receiving body and into the cavity of the first arm member, the axle having a hole;
    a friction adjustment mechanism comprising:
        a plurality of rotatable elements positioned in the cavity that are attached to the axle such that the rotatable elements rotate when the axle rotates,
        a plurality of friction inducing elements positioned in the cavity, each of the friction inducing elements attached to the first arm member, each of the friction inducing elements having an inner opening, through which the axle extends, the inner opening of each of the friction inducing elements being sized so that the axle is rotatable when extending through the inner opening,
        the friction inducing elements being positioned adjacent to the rotatable elements such that at least one of the rotatable elements rubs against or engages at least one of the friction inducing elements when the axle rotates, and
        a rotatable member extending into the hole of the axle, the rotatable member rotatable in a first direction to move further into the hole and rotatable in a second direction that is opposite the first direction to move out of the hole, movement of the rotatable member in the first direction causing the friction inducing elements to be further compressed against the rotatable elements to increase an amount of friction caused by rotation of the axle.

2. The support apparatus of claim 1 further comprising a mechanical tool releasably attached to the mounting body, the mechanical tool positionable to engage the rotatable member to drive rotational movement of the rotatable member for adjusting the amount of friction induced between the rotatable elements and the friction inducing elements caused by rotation of the axle; and
    wherein the friction adjustment mechanism is also comprised of a body portion positioned adjacent to the first arm member such that the first arm member is between the axle receiving body and the body portion, the rotatable member extending through the body portion of the friction adjustment mechanism for extending into the hole of the axle.

3. The support apparatus of claim 1 wherein the friction inducing elements each have at least one aperture that is sized to mate with at least one protuberance of the first arm member that extends into the cavity or is positioned adjacent the cavity.

4. The support apparatus of claim 3 wherein the at least one protuberance of the first arm member comprises a plurality of protuberances and the at least one aperture of each of the friction inducing elements is comprised of a plurality of apertures, and wherein movement of the rotatable member in the first direction causes the friction inducing elements to move along the protuberances.

5. The support apparatus of claim 1 wherein at least one of the friction inducing elements is positioned between different rotatable elements.

6. The support apparatus of claim 1 wherein the rotatable elements comprise a first rotatable element, a second rotatable element and a third rotatable element and wherein the friction inducing elements comprise a first friction inducing element, a second friction inducing element and a third friction inducing element and wherein the first friction inducing element is positioned between the first and second rotatable elements and the second friction inducing element is positioned between the second and third rotatable elements and the third friction inducing element is positioned next to the third rotatable element on a side of the third rotatable element that is opposite a side of the third rotatable element along which the second friction inducing element is positioned.

7. The support apparatus of claim 1 wherein the rotatable member is a bolt or a screw.

8. The support apparatus of claim 1 wherein the axle has a middle portion located between a first end and a second end opposite the first end, the middle portion having a polygonal cross section.

9. The support apparatus of claim 1 wherein the friction adjustment mechanism is also comprised of a body portion positioned adjacent to the first arm member such that the first arm member is between the axle receiving body and the body portion, the rotatable member extending through the body portion of the friction adjustment mechanism for extending into the hole of the axle, the body portion of the friction adjustment mechanism moving when the rotatable member rotates in the first direction.

10. The support apparatus of claim 9 wherein the body portion of the friction adjustment mechanism is attached to the mounting body.

11. The support apparatus of claim 1 wherein the mounting body is comprised of a peripheral frame rotatably attached to an inner portion and wherein the axle receiving body is attached to the mounting body by being attached to the inner portion of the mounting body.

12. The support apparatus of claim 1 wherein the mounting body is sized and configured to hold or retain a monitor, liquid crystal display, a display device, or a television.

13. The support apparatus of claim 1 further comprising a post, the arm assembly being attached to the post.

14. The support apparatus of claim 13 further comprising a collar moveably attached to the post such that the collar is moveable along the post and wherein the arm assembly is positioned on or attached to the collar such that movement of the collar along the post vertically adjusts a position of the arm assembly.

15. The support apparatus of claim 1 wherein the axle has a first end, a second end opposite the first end and a middle portion between the first end and the second end and wherein the second end of the axle is adjacent the axle receiving body, and the middle portion is positioned in the cavity of the first arm member.

16. The support apparatus of claim 15 wherein the first end of the axle is also in the cavity of the first arm member.

17. The support apparatus of claim 1 wherein the arm assembly is comprised of a second arm member pivotally attached to the first arm member.

18. The support apparatus of claim 1 further comprising a positionable body moveably attached to an inner portion of the mounting body, the positionable body engaging a lip of a peripheral frame portion of the mounting body that is rotatable about the inner portion of the mounting body, the positionable body being adjustably positionable to at least one of increase and decrease an amount of force needed to rotate the peripheral frame portion of the mounting body about the inner portion of the mounting body.

19. The support apparatus of claim 18 wherein the rotatable member is a first rotatable member and the support apparatus further comprising:
- a mechanical tool releasably attached to the mounting body, the mechanical tool positionable to engage the first rotatable member to drive rotational movement of the rotatable member for adjusting an amount of friction induced between the rotatable elements and the friction inducing elements caused by rotation of the axle; and
- a second rotatable member that passes through an opening of the positionable body, the second rotatable member being moveable into and out of a channel defined within one of the inner portion of the mounting body and a member receiving body attached to the inner portion of the mounting body, the mechanical tool positionable to engage the second rotatable member to drive rotational movement of the second rotatable member to adjust a position of the positionable body to at least one of increase and decrease the amount of force needed to rotate the peripheral frame portion of the mounting body about the inner portion of the mounting body.

20. The support apparatus of claim 1 wherein each of the rotatable elements is a washer and the friction inducing elements are each comprised of an annular body or a washer.

* * * * *